US012686801B2

(12) United States Patent
Wang et al.

(10) Patent No.: US 12,686,801 B2
(45) Date of Patent: Jul. 21, 2026

(54) NEAR-AZEOTROPIC REFRIGERANT OF TERNARY MIXTURE CO₂/R41/R170

(71) Applicant: ANHUI UNIVERSITY OF TECHNOLOGY, Ma'anshan City (CN)

(72) Inventors: Dong Wang, Ma'anshan City (CN);
Sensen Deng, Ma'anshan City (CN);
Aiquan Jia, Ma'anshan City (CN);
Mengxue Li, Ma'anshan City (CN)

(73) Assignee: ANHUI UNIVERSITY OF TECHNOLOGY, Ma'anshan City (CN)

( * ) Notice: Subject to any disclaimer, the term of this patent is extended or adjusted under 35 U.S.C. 154(b) by 608 days.

(21) Appl. No.: 18/200,293

(22) Filed: May 22, 2023

(65) Prior Publication Data

US 2024/0228851 A1 Jul. 11, 2024

(30) Foreign Application Priority Data

Jan. 5, 2023 (CN) .......................... 202310012142.9

(51) Int. Cl.
C09K 5/04 (2006.01)

(52) U.S. Cl.
CPC .............. C09K 5/045 (2013.01); C09K 5/042 (2013.01); C09K 2205/106 (2013.01); C09K 2205/12 (2013.01); *C09K 2205/122* (2013.01); *C09K 2205/24* (2013.01); *C09K 2205/32* (2013.01)

(58) Field of Classification Search
CPC .............. C09K 5/045; C09K 2205/106; C09K 2205/122; C09K 2205/32; C09K 2205/12; C09K 2205/24
See application file for complete search history.

(56) References Cited

U.S. PATENT DOCUMENTS

2019/0093926 A1* 3/2019 Haack .................... C09K 5/042

FOREIGN PATENT DOCUMENTS

DE 102019119194 A1 * 1/2021 ............. C09K 5/045

* cited by examiner

*Primary Examiner* — Matthew R Diaz
*Assistant Examiner* — Aja Aryanna Walker
(74) *Attorney, Agent, or Firm* — Edell, Shapiro & Finnan, LLC

(57) ABSTRACT

Provided is a near-azeotropic refrigerant of a ternary mixture CO₂/R41/R170, including the following components by mass percentage: 10% to 64% of CO₂, 10% to 47% of R41, and 26% to 52% of R170. The near-azeotropic refrigerant has a low global warming potential (GWP) and a low temperature glide, and can still maintain a near-azeotropic effect at −90° C.

5 Claims, 7 Drawing Sheets

NEAR-AZEOTROPIC REFRIGERANT OF TERNARY MIXTURE CO$_2$/R41/R170

CROSS REFERENCE TO RELATED APPLICATION

This application claims the benefit and priority of Chinese Patent Application No. 202310012142.9 filed with the China National Intellectual Property Administration on Jan. 5, 2023, the disclosure of which is incorporated by reference herein in its entirety as part of the present application.

TECHNICAL FIELD

The present disclosure relates to the technical field of refrigerants, in particular to a near-azeotropic mixture refrigerant.

BACKGROUND

Refrigerants are media substances to complete energy conversion in refrigeration equipments such as air conditioners, refrigerators, and freezers. Hydrofluorocarbons (HFCs) are the most commonly used refrigerants at present. However, due to the high global warming potential (GWP) of HFCs, the Kigali Amendment stipulates that most developed countries should reduce the consumption of HFCs from 2019, and developing countries should freeze the consumption level of HFCs in 2024. Accordingly, it is an urgent task in the current refrigeration/heat pump industry to find low-GWP alternative refrigerants that cause less impact on the environment, which may also become an inevitable trend in future product development.

There are currently two main development directions for alternative refrigerants. One is a new type of synthetic compound, which has high cost and may be potentially harmful. The other is natural refrigerants, such as CO$_2$, NH$_3$, and HCS, among which CO$_2$ is considered to be the most promising refrigerant. CO$_2$ has zero ozone depletion potential (ODP=0), and low global warming potential (GWP=1), which is non-combustible and non-toxic, and shows low cost and high thermodynamic properties. Therefore, CO$_2$ refrigeration systems have been widely used in air conditioners (including household and automobile air conditioners), heat pumps (including heat-pump water heaters and heat-pump fan heaters), refrigerators (including household and commercial refrigerators), and cascade refrigeration systems. However, there are still some inherent deficiencies to be addressed in the CO$_2$ refrigeration system, such as high working pressure, low efficiency, and overheated compressor discharge.

In order to address the above deficiencies, some CO$_2$-based zeotropic mixture refrigerants, such as CO$_2$/R290, CO$_2$/R600, and CO$_2$/R32, have been researched and applied in recent years. Zhang et al. in the article "*An Investigation of Heat Pump System Using CO$_2$/Propane Mixture as a Working Fluid*" recited that R290 was selected as the most suitable component candidate for mixing with CO$_2$ from seven mixtures containing CO$_2$ (CO$_2$/R290, CO$_2$/R600a, CO$_2$/R600, CO$_2$/R1270, CO$_2$/R170, CO$_2$/R601, and CO$_2$/RE170). The performance of a heat pump system when a small amount of R290 was added to CO$_2$ was investigated experimentally and compared with that of pure CO$_2$. The research results show that adding R290 to CO$_2$ can effectively reduce the discharge pressure of the heat pump system and improve system performances. Five different cascade refrigeration cycles (CO$_2$/NH$_3$, CO$_2$/R22, CO$_2$/R32, CO$_2$/

R290, and CO$_2$/R404a) were analyzed by Liu et al. in the article "*Thermodynamic Analysis of Different CO$_2$ Cascade Refrigeration Cycle*". The analysis results show that under a given working condition, the coefficient of performance (COP) of the CO$_2$/NH$_3$ cycle is the largest, while the COP of CO$_2$/R32 cycle is basically the same as that of CO$_2$/R290 cycle. Except for the CO$_2$/R404a cycle, the COP of various cascade refrigeration cycles decrease with an increasing condensing temperature. However, due to the temperature glide (temperature glide refers to a temperature change value when a mixture undergoes phase change at a constant pressure) and mass transfer resistance during the boiling, the heat transfer coefficient of zeotropic working mixture is lower than that of pure refrigerants and azeotropic/near-azeotropic mixture refrigerants. In addition, in the application of zeotropic mixture, it is difficult to overcome the inherent compositional changes during leakage or replenishment.

Therefore, azeotropic/near-azeotropic mixtures as refrigerants are interested increasingly. Due to the fact that they can integrate the advantages of each component, overcome the inherent defects of zeotropic working mixtures, and exhibit the same characteristics as those of a pure refrigerant during the boiling, the azeotropic/near-azeotropic mixtures are preferred among different types of mixtures. In the actual application, it is found that the heat transfer performance of azeotropic/near-azeotropic refrigerants is significantly higher than that of the zeotropic refrigerants.

At present, R410A, as a typical near-azeotropic working mixture, is one of the most widely used mixture refrigerants in the Chinese market. During the whole operating, this mixture refrigerant has a temperature glide of less than 0.2° C., thus making the migration of components in the mixture extremely small, which is beneficial to the replenishment of the mixed refrigerant. However, the extremely high GWP (about 2,100) of R410A leads to a serious greenhouse effect, which cannot meet the requirements of environmental protection.

Patent publication No. CN111662685A discloses a ternary mixture refrigerant including carbon dioxide (CO$_2$) and difluoromethane (R32), where a third component is one or more selected from the group consisting of trifluoroiodomethane (CF$_3$I), fluoromethane (CH$_3$F), ethane (C$_2$H$_6$), 1,1-difluoroethylene (C$_2$H$_2$F$_2$), ethylene (C$_2$H$_4$), fluoroethylene (C$_2$H$_3$F), acetylene (C$_2$H$_2$), propane (C$_3$H$_8$), propylene (C$_3$H$_6$), and fluoroethane (CH$_2$FCH$_3$). The ternary mixture refrigerant has a lower GWP and makes less "contribution" to the greenhouse effect. However, this refrigerant has a temperature glide up to 22.1° C., and belongs to a zeotropic working mixture. If this refrigerant is used in a refrigeration or heat pump system, it is difficult to avoid the component migration during operation, and the component concentration may deviate from a designed concentration when refrigerant leakage occurs. During replenishing and injecting the refrigerant, the original refrigerant should only be emptied before injecting a new refrigerant. This inevitably leads to a large waste of the refrigerant, and also increases a lot of unnecessary refrigerant emissions, which makes the greenhouse effect enhance and the usage cost increase even if there is a low GWP.

So far, no near-azeotropic refrigerant of a ternary mixture has been found that can simultaneously achieve a relatively low temperature glide and an extremely low GWP. Therefore, in order to meet the market demand, it is urgent to develop a near-azeotropic refrigerant of a ternary mixture that can be used as an alternative of the refrigerants such as R134a and R290, which are widely used in the market. The near-azeotropic refrigerant of a ternary mixture has an excellent heat transfer performance, can meet environmental protection requirements, and may not increase the usage cost due to a high temperature glide.

SUMMARY

In view of this, the present disclosure provides a near-azeotropic refrigerant of a ternary mixture $CO_2/R41/R170$. The near-azeotropic refrigerant has a relatively low temperature glide and an extremely low GWP. With the low temperature glide and high heat transfer performance, the refrigerant could well solve the above problems present in the existing refrigerants.

To achieve the above object, the present disclosure adopts the following technical solutions.

The present disclosure provides a near-azeotropic refrigerant of a ternary mixture $CO_2/R41/R170$, including the following components by mass percentage: 10% to 64% of $CO_2$, 10% to 47% of R41, and 26% to 52% of R170, wherein the near-azeotropic refrigerant has a temperature glide of less than 0.2° C. at a bubble point temperature of below 0° C.

In some embodiments, the near-azeotropic refrigerant includes the following components by mass percentage: 10% to 60% of the $CO_2$, 10% to 42% of the R41, and 30% to 48% of the R170; and the near-azeotropic refrigerant has a bubble point temperature of −20° C. to 0° C.

In some embodiments, the near-azeotropic refrigerant includes the following components by mass percentage: 10% to 58% of the $CO_2$, 10% to 38% of the R41, and 32% to 52% of the R170; and the near-azeotropic refrigerant has a bubble point temperature of −40° C. to 0° C.

In some embodiments, the near-azeotropic refrigerant includes the following components by mass percentage: 10% to 54% of the $CO_2$, 10% to 38% of the R41, and 36% to 52% of the R170; and the near-azeotropic refrigerant has a bubble point temperature of −60° C. to 0° C.

In some embodiments, the near-azeotropic refrigerant includes the following components by mass percentage: 20% to 50% of the $CO_2$, 10% to 30% of the R41, and 40% to 50% of the R170; and the near-azeotropic refrigerant has a bubble point temperature of −80° C. to 0° C.

In some embodiments, the near-azeotropic refrigerant includes the following components by mass percentage: 27% to 47% of the $CO_2$, 11% to 25% of the R41, and 42% to 48% of the R170; and the near-azeotropic refrigerant has a bubble point temperature of −90° C. to 0° C.

In the present disclosure, the near-azeotropic refrigerant of the ternary mixture $CO_2/R41/R170$ prepared by mixing $CO_2$, R170, and R41 at a certain mass percentage has the following advantages:

I. In the present disclosure, the near-azeotropic refrigerant of the ternary mixture $CO_2/R41/R170$ has relatively low GWP and temperature glide, so that the near-azeotropic refrigerant could be directly replaced the $CO_2$ refrigerant in an original $CO_2$ system without changing or re-optimizing design of the equipment, while ensuring a small impact on the environment; the problems such as system instability caused by the migration of refrigerant components could be avoided; meanwhile, when the refrigerant is replenished in the system with the $CO_2/R41/R170$ near-azeotropic refrigerant, it is not necessary to empty all the original refrigerant, but only to add new refrigerant directly. The above advantages could significantly reduce use cost and are conducive to commercial application and popularization.

II. In the present disclosure, the near-azeotropic refrigerant of the ternary mixture $CO_2/R41/R170$ has a temperature glide of less than 0.2° C. at a bubble point temperature of −90° C., and thereby achieves extremely high application and market prospects in refrigeration and heat pump systems.

III. Comparing with the R134a and R290 refrigerants that are currently widely used, the near-azeotropic refrigerant of a ternary mixture $CO_2/R41/R170$ has lower discharge temperature and specific work, and higher coefficient of performance (COP/$COP_h$) of refrigeration/heating and exergy efficiency under the same application condition.

BRIEF DESCRIPTION OF THE DRAWINGS

In FIG. 2, 0-7, 0'-7', and 0"-7" represent $CO_2/R41/R170$ cycle, R134a cycle, and R290 cycle, respectively; 11 represents an evaporator; 12 represents an internal heat exchanger; 13 represents a compressor; 14 represents a gas cooler (condenser); 15 represents an expansion valve; and 16 represents water.

DETAILED DESCRIPTION OF THE EMBODIMENTS

The technical solutions in the embodiments of the present disclosure will be clearly and completely described with reference to the accompanying drawings in the embodiments of the present disclosure. Apparently, the described examples are merely some rather than all of the examples of the present disclosure. All other examples obtained by a person skilled in the art based on the examples of the present disclosure without creative conditions shall fall within the protection scope of the present disclosure.

In the present disclosure, the symbol "/" refers to the meaning of "and"; for example, in some embodiments, the $CO_2/R170/R41$ means "$CO_2$, and R170 and R41". R170 refers to ethane, R41 refer to fluoromethane.

In this example, provided is a near-azeotropic refrigerant of a ternary mixture, wherein the near-azeotropic refrigerant consists of $CO_2$, R170, and R41. All the three components $CO_2$, R170, and R41 are readily available. $CO_2$ is a linear symmetrical molecule without polarity. The R170 (ethane) has the same conformation of the carbon stem arrangement, with absolutely symmetrical configuration and a molecular dipole moment of 0, and without polarity. The R41 has a tetrahedral configuration with extremely weak polarity. According to the principle of similar miscibility, the three substances can be dissolved in any proportion under the same temperature and pressure. $CO_2$ molecule has a C=O bond with high bond energy, the R170 molecule has a C—H bond that is difficult to break, and the R41 molecule has a C—H bond and a C—F bond that are difficult to break. Under refrigeration/heat pump operating conditions, the three substances are chemically stable and do not react chemically when being mixed.

Figure 1:
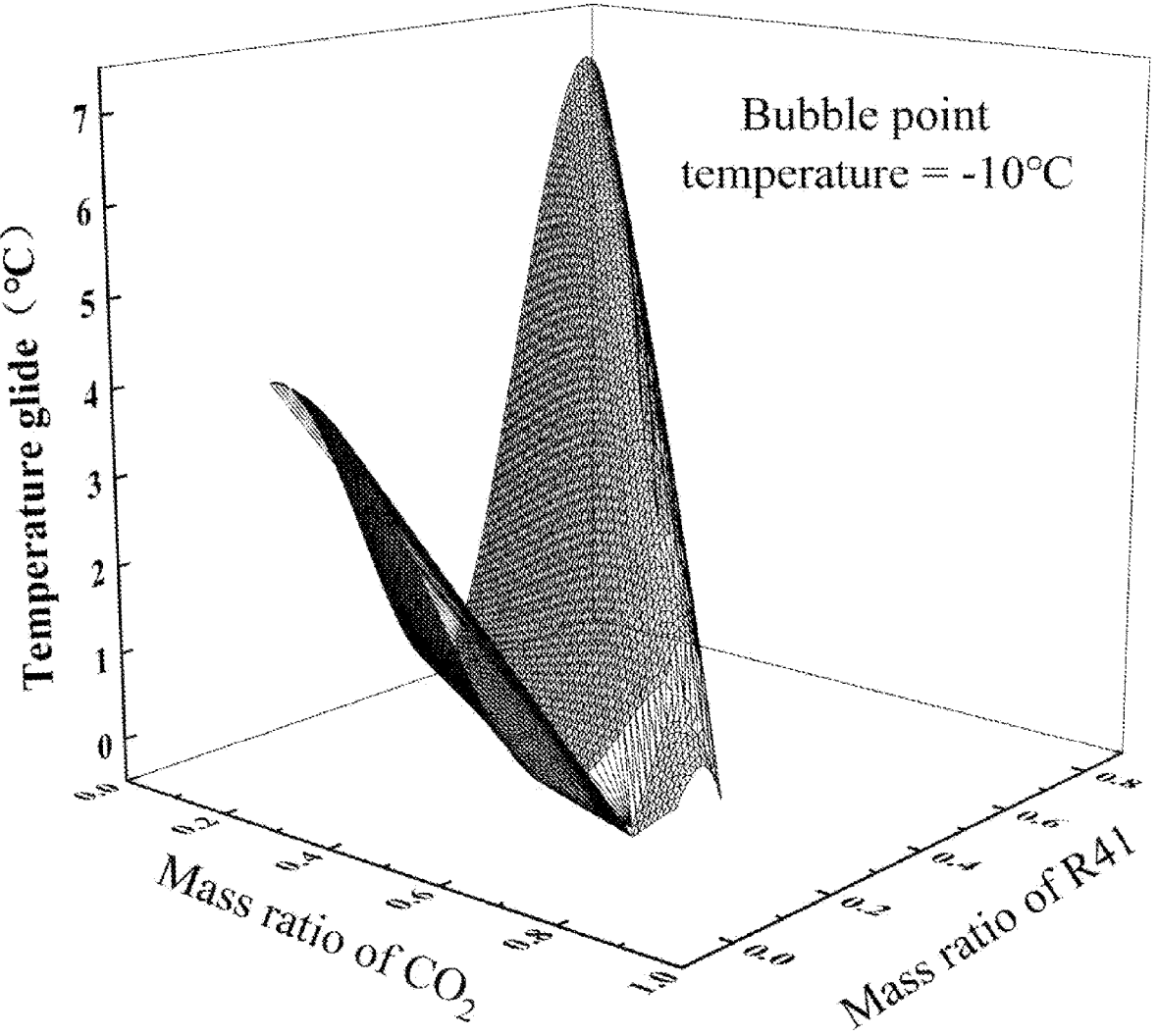
FIG. 1 shows a temperature glide of the near-azeotropic refrigerant of a ternary mixture $CO_2/R41/R170$ at a bubble point temperature of −10° C.

As shown in FIG. 1, at a bubble point temperature of −10° C., the variation of the temperature glide with the proportion of each component were observed. It can be seen that the temperature glide of the refrigerant $CO_2$/R41/R170 is in a range of 0° C. to 7° C. at the bubble point temperature of −10° C. Since the zeotropic refrigerant is prone to leakage during operation, the resulting migration of components might have a negative impact on the system. In order to overcome this problem, a part with the temperature glide of less than 0.2° C. (near-azeotropic mixture refrigerant) was selected. Table 1 shows the mass ratios of the refrigerant $CO_2$/R170/R41 at different bubble point temperatures when the temperature glide is less than 0.2° C.

TABLE 1

| Ratio of each component of the refrigerant $CO_2$/R41/R170 at different bubble point temperatures when the temperature glide is less than 0.2° C. | | | |
|---|---|---|---|
| Bubble point temperature (° C.) | Mass ratio of $CO_2$ | Mass ratio of R41 | Mass ratio of R170 | Temperature glide (° C.) |
| −90 | 0.27-0.47 | 0.25-0.11 | 0.48-0.42 | <0.2 |
| −80 | 0.2-0.5 | 0.3-0.1 | 0.5-0.4 | <0.2 |
| −60 | 0.1-0.54 | 0.38-0.1 | 0.52-0.36 | <0.2 |
| −40 | 0.1-0.58 | 0.38-0.1 | 0.52-0.32 | <0.2 |
| −20 | 0.1-0.6 | 0.42-0.1 | 0.48-0.3 | <0.2 |
| 0 | 0.1-0.64 | 0.47-0.1 | 0.43-0.26 | <0.2 |

It can be seen from Table 1 that the near-azeotropic refrigerant of a ternary mixture has a minimum bubble point temperature of −90° C. at a temperature glide of less than 0.2° C. This shows that a refrigeration system using the near-azeotropic refrigerant of a ternary mixture could be applied in an extremely low-temperature environment.

In order to further verify the advantages of the near-azeotropic refrigerant of a ternary mixture in the present disclosure, an HPWH system was taken as an example in this example. The standard working conditions were selected as follows: the ambient temperature was 16° C., and the temperatures of the hot water inlet and outlet of the HPWH system were 17° C. and 65° C., respectively. The performance of the heat pump system using the $CO_2$/R41/R170 mixture, the R134a and the R290 as a refrigerant were calculated, respectively.

In this example, the thermodynamic analysis of energy and exergy was based on the following premise:
    (1) for the HPWH system, the ambient temperature was 16° C., while the water temperatures at the hot water inlet and outlet were 17° C. and 65° C., respectively;
    (2) the system cycles of the three refrigerants studied each were operated under stable conditions;
    (3) Both the compression process and the expansion process were adiabatic but non-isentropic;

(4) the heat loss and pressure drop of the refrigerant flowing in a heat exchanger and connecting pipes were ignored;
    (5) the refrigerant was saturated at the outlet of the evaporator; and
    (6) the lubricating oil did not flow with the refrigerant.

I. Thermodynamic Analysis of Energy

Evaporator Cooling Capacity:

$$q_e = \dot{m}(h_0 - h_5) \tag{1}$$

$$q'_e = \dot{m}(h_{0'} - h_{5'}) \tag{2}$$

$$q''_e = \dot{m}(h_{2''} - h_{3''}) \tag{3}$$

Gas Cooler/Condenser Heating Capacity:

$$q_{gc} = \dot{m}(h_2 - h_3) \tag{4}$$

$$q_{cond} = \dot{m}(h_{2'} - h_{3'}) \tag{5}$$

$$q'_{cond} = \dot{m}(h_{2''} - h_{3''}) \tag{6}$$

Energy Balance of an Internal Heat Exchanger:

$$\dot{m}(h_1 - h_0) = \dot{m}(h_3 - h_4) \tag{7}$$

$$\dot{m}(h_{1'} - h_{0'}) = \dot{m}(h_{3'} - h_{4'}) \tag{8}$$

$$\dot{m}(h_{1''} - h_{0''}) = \dot{m}(h_{3''} - h_{4''}) \tag{9}$$

Efficiency of an Internal Heat Exchanger:

$$\beta_{ihe} = \frac{T_1 - T_0}{T_3 - T_0} \tag{10}$$

$$\beta'_{ihe} = \frac{T_{1'} - T_{0'}}{T_{3'} - T_{0'}} \tag{11}$$

$$\beta''_{ihe} = \frac{T_{1''} - T_{0''}}{T_{3''} - T_{0''}} \tag{12}$$

Compressor Output Power:

$$w_{comp} = \dot{m}(h_2 - h_1) \tag{13}$$

$$w'_{comp} = \dot{m}(h_{2'} - h_{1'}) \tag{14}$$

$$w''_{comp} = \dot{m}(h_{2''} - h_{1''}) \tag{15}$$

Compressor Isentropic Efficiency:

$$\varepsilon_{is} = (h_{2s} - h_1)/(h_2 - h_1) \tag{16}$$

$$\varepsilon'_{is} = (h_{2s'} - h_{1'})/(h_{2'} - h_{1'}) \tag{17}$$

$$\varepsilon''_{is} = (h_{2s''} - h_{1''})/(h_{2''} - h_{1''}) \tag{18}$$

$\varepsilon_{is}$ could also be calculated from the following formulas:

$$\varepsilon_{is} = 0.815 + 0.022\left(\frac{p_2}{p_1}\right) - 0.0041\left(\frac{p_2}{p_1}\right)^2 + 0.0001\left(\frac{p_2}{p_1}\right)^3 \tag{19}$$

$$\varepsilon'_{is} = 0.815 + 0.022\left(\frac{p_{2'}}{p_{1'}}\right) - 0.0041\left(\frac{p_{2'}}{p_{1'}}\right)^2 + 0.0001\left(\frac{p_{2'}}{p_{1'}}\right)^3 \tag{20}$$

$$\varepsilon''_{is} = 0.815 + 0.022\left(\frac{p_{2''}}{p_{1''}}\right) - 0.0041\left(\frac{p_{2''}}{p_{1''}}\right)^2 + 0.0001\left(\frac{p_{2''}}{p_{1''}}\right)^3 \tag{21}$$

$COP_h$ was calculated by the following formulas:

$$COP_h = \frac{h_2 - h_3}{h_2 - h_1} \tag{2}$$

$$COP'_h = \frac{h_{2'} - h_{3'}}{h_{2'} - h_{1'}} \tag{23}$$

$$COP''_h = \frac{h_{2''} - h_{3''}}{h_{2''} - h_{1''}} \tag{24}$$

In the $CO_2/R41/R170$, R134a, and R290 systems, it was ensured that an evaporation temperature ($T_e$) was the same as a heat transfer temperature difference ($\Delta T_m$) between the gas cooler/condenser and external fluid.

For the HPWH system of $CO_2/R41/R170$: the heat transfer temperature difference between gas cooler and hot water was obtained by the following calculation:

$$\Delta T_m = \frac{|(T_3 - T_6) - (T_2 - T_7)|}{\left|\ln\frac{(T_3 - T_6)}{(T_2 - T_7)}\right|} \tag{25}$$

For the HPWH system of R134a: the heat transfer temperature difference between condenser and hot water was calculated by the following calculation:

$$\Delta T_m = \frac{(T_{7'} - T_{6'})}{\ln\frac{(T_c - T_{6'})}{(T_{2'} - T_{7'})}} \tag{26}$$

$T_c$ represents a condensing temperature of the HPWH system of R134a, in ° C.

For the HPWH system of R290: the heat transfer temperature difference between condenser and hot water was calculated by the following calculation:

$$\Delta T_m = \frac{(T_{7''} - T_{6''})}{\ln\frac{(T'_c - T_{6''})}{(T_{2''} - T_{7''})}} \tag{27}$$

$T'_c$ represents a condensing temperature of the HPWH system of R134a, in ° C.

II. Thermodynamic Analysis of Exergy

Irreversible Loss of Compressor:

$$I_{com} = T_{en}(s_2 - s_1) \tag{28}$$

$$I'_{com} = T_{en}(s_{2'} - s_{1'}) \tag{29}$$

$$I''_{com} = T_{en}(s_{2''} - s_{1''}) \tag{30}$$

$T_{en}$ represents an ambient temperature outside the HPWH system, at 16° C.

Irreversible Loss of Capillary:

$$I_{cap} = T_{en}(s_5 - s_4) \tag{31}$$

$$I'_{cap} = T_{en}(s_{5'} - s_{4'}) \tag{32}$$

$$I''_{cap} = T_{en}(s_{5''} - s_{4''}) \tag{33}$$

Irreversible Loss in Internal Heat Exchanger:

$$I_{ihe} = T_{en}[(s_1 - s_0) + (s_4 - s_3)] \tag{34}$$

$$I'_{ihe} = T_{en}[(s_{1'} - s_{0'}) + (s_{4'} - s_{3'})] \tag{35}$$

$$I''_{ihe} = T_{en}[(s_{1''} - s_{0''}) + (s_{4''} - s_{3''})] \tag{36}$$

Irreversible Loss of Evaporator:

$$I_e = T_{en}(s_0 - s_5) - (h_0 - h_5) \tag{37}$$

$$I'_e = T_{en}(s_{0'} - s_{5'}) - (h_{0'} - h_{5'}) \tag{38}$$

$$I''_e = T_{en}(s_{0''} - s_{5''}) - (h_{0''} - h_{5''}) \tag{39}$$

Irreversible Loss of Gas Cooler/Condenser:

$$I_{gc} = T_{en}(h_0 - h_5)/T_{evef} - T_{en}(s_0 - s_5) \tag{40}$$

$$I'_{cond} = T_{en}(h_{0'} - h_{5'})/T_{evef} - T_{en}(s_{0'} - s_{5'}) \tag{41}$$

$$I''_{cond} = T_{en}(h_{0''} - h_{5''})/T_{evef} - T_{en}(s_{0''} - s_{5''}) \tag{42}$$

$$\text{Where, } T_{evef} = \frac{(T_7 - T_6)}{\ln(T_7/T_6)} \tag{43}$$

In the above formula, $T_6$ represents a hot water inlet temperature in the HPWH system, at 17° C.; and $T_7$ represents a hot water outlet temperature in the HPWH system, at 65° C.

Irreversibility of the Whole System:

$$I_{total} = I_{com} + I_{ihe} + I_{cap} + I_e + I_{gc} \tag{44}$$

$$I'_{total} = I'_{com} + I'_{ihe} + I'_{cap} + I'_e + I_{cond} \tag{45}$$

$$I''_{total} = I''_{com} + I''_{ihe} + I''_{cap} + I''_e + I'_{cond} \tag{46}$$

Exergy Efficiency of the Whole System:

$$\eta = 1 - I_{total}/w_{com} \tag{47}$$

$$\eta' = 1 - I'_{total}/w'_{com} \tag{48}$$

$$\eta'' = 1 - I''_{total}/w''_{com} \tag{49}$$

A specific research method was as follows:

Step I: a water valve was adjusted to control the flow rate of hot water, and the water temperature at the inlet and outlet were kept at 17° C. and 65° C., respectively. The opening of an expansion valve was adjusted, and the corresponding evaporation temperature ($T_e$) and gas cooler outlet temperature ($T_{ge,o}$) were measured as reference parameters. The evaporation temperature was kept the same as the heat transfer temperature difference ($\Delta T_m$) between the gas cooler/condenser and the external fluid in the three systems required for comparison. The parameter $\Delta T_m$ was calculated by equation (25).

Step II: the evaporation temperature ($T_e$) and the gas cooler outlet temperature ($T_{ge,o}$), the evaporation temperature, and the heat transfer temperature difference between the gas cooler/condenser and the external fluid were taken as the benchmark parameters, to obtain other performance indicators such as $COP_h$ and discharge temperature of the three systems.

Step III: the external conditions of the three systems were input into the thermodynamic formulas (equations (28) to (49)), to obtain the irreversible loss and exergy efficiency of each system.

In this example, $T_e$ was –90° C. to 0° C., and $T_{ge,o}$ was 35° C.

In the R134a system, the parameters $T_e$ and $\Delta T_m$ were input into the energy thermodynamic formulas (equations (2), (5), (8), (11), (14), (17), (20), (23), and (26)), to obtain the performance parameters in the R134a system, as shown in Table 2.

In the R290 system, the parameters $T_e$ and $\Delta T_m$ were input into the energy thermodynamic formulas (equations (3), (6), (9), (12), (15), (18), (21), (24), and (27)), to obtain the performance parameters in the R290 system, as shown in Table 2.

In the $CO_2$/R41/R170 system, the parameters were input into the formulas (1), (4), (7), (10), (13), (16), (19), and (22), to obtain $COP_h$ of the system under different ratios, as shown in Table 3 to Table 8.

TABLE 2

| | $COP_h$ of system in Comparative Example | |
|---|---|---|
| Refrigerant | $COP_h$ ($T_e$ = 0° C., $T_{gc,o}$ = 35° C.) | $COP_h$ ($T_e$ = –20° C., $T_{gc,o}$ = 35° C.) |
| R134a | 1.903 | 1.807 |
| R290 | 3.105 | 2.042 |

TABLE 3

| $COP_h$ ($T_e$ = 0° C., $T_{gc,o}$ = 35° C.) of system in the present disclosure under different refrigerant ratios | |
|---|---|
| Refrigerant | $COP_h$ ($T_e$ = 0° C., $T_{gc,o}$ = 35° C.) |
| $CO_2$/R41/R170(0.1/0.47/0.43) | 3.367 |
| $CO_2$/R41/R170(0.15/0.45/0.4) | 3.362 |
| $CO_2$/R41/R170(0.15/0.47/0.38) | 3.361 |
| $CO_2$/R41/R170(0.2/0.4/0.4) | 3.360 |
| $CO_2$/R41/R170(0.2/0.45/0.35) | 3.359 |
| $CO_2$/R41/R170(0.2/0.47/0.33) | 3.355 |
| $CO_2$/R41/R170(0.25/0.35/0.4) | 3.353 |
| $CO_2$/R41/R170(0.25/0.4/0.35) | 3.351 |
| $CO_2$/R41/R170(0.25/0.45/0.3) | 3.349 |
| $CO_2$/R41/R170(0.25/0.47/0.28) | 3.347 |
| $CO_2$/R41/R170(0.3/0.3/0.4) | 3.352 |
| $CO_2$/R41/R170(0.3/0.35/0.35) | 3.356 |
| $CO_2$/R41/R170(0.3/0.4/0.3) | 3.351 |
| $CO_2$/R41/R170(0.35/0.25/0.4) | 3.342 |
| $CO_2$/R41/R170(0.35/0.3/0.35) | 3.337 |
| $CO_2$/R41/R170(0.35/0.35/0.3) | 3.352 |
| $CO_2$/R41/R170(0.4/0.2/0.4) | 3.355 |
| $CO_2$/R41/R170(0.4/0.25/0.35) | 3.352 |

TABLE 3-continued

| $COP_h$ ($T_e$ = 0° C., $T_{gc,o}$ = 35° C.) of system in the present disclosure under different refrigerant ratios | |
|---|---|
| Refrigerant | $COP_h$ ($T_e$ = 0° C., $T_{gc,o}$ = 35° C.) |
| $CO_2$/R41/R170(0.4/0.3/0.3) | 3.349 |
| $CO_2$/R41/R170(0.45/0.15/0.4) | 3.343 |
| $CO_2$/R41/R170(0.45/0.2/0.35) | 3.347 |
| $CO_2$/R41/R170(0.45/0.25/0.3) | 3.339 |
| $CO_2$/R41/R170(0.5/0.1/0.4) | 3.317 |
| $CO_2$/R41/R170(0.5/0.15/0.35) | 3.352 |
| $CO_2$/R41/R170(0.5/0.2/0.3) | 3.348 |
| $CO_2$/R41/R170(0.55/0.1/0.35) | 3.345 |
| $CO_2$/R41/R170(0.55/0.15/0.3) | 3.342 |
| $CO_2$/R41/R170(0.64/0.1/0.26) | 3.341 |

TABLE 4

| $COP_h$ ($T_e$ = –20° C., $T_{gc,o}$ = 35° C.) of system in the present disclosure under different refrigerant ratios | |
|---|---|
| Refrigerant | $COP_h$ ($T_e$ = –20° C., $T_{gc,o}$ = 35° C.) |
| $CO_2$/R41/R170(0.1/0.42/0.48) | 2.551 |
| $CO_2$/R41/R170(0.15/0.4/0.45) | 2.550 |
| $CO_2$/R41/R170(0.15/0.42/0.43) | 2.549 |
| $CO_2$/R41/R170(0.2/0.35/0.45) | 2.548 |
| $CO_2$/R41/R170(0.2/0.4/0.4) | 2.547 |
| $CO_2$/R41/R170(0.2/0.42/0.38) | 2.543 |
| $CO_2$/R41/R170(0.25/0.3/0.45) | 2.541 |
| $CO_2$/R41/R170(0.25/0.35/0.4) | 2.539 |
| $CO_2$/R41/R170(0.25/0.4/0.35) | 2.537 |
| $CO_2$/R41/R170(0.25/0.42/0.33) | 2.535 |
| $CO_2$/R41/R170(0.3/0.25/0.45) | 2.540 |
| $CO_2$/R41/R170(0.3/0.3/0.4) | 2.544 |
| $CO_2$/R41/R170(0.3/0.35/0.35) | 2.538 |
| $CO_2$/R41/R170(0.3/0.4/0.3) | 2.530 |
| $CO_2$/R41/R170(0.35/0.2/0.45) | 2.525 |
| $CO_2$/R41/R170(0.35/0.25/0.4) | 2.538 |
| $CO_2$/R41/R170(0.35/0.3/0.35) | 2.543 |
| $CO_2$/R41/R170(0.35/0.35/0.3) | 2.540 |
| $CO_2$/R41/R170(0.4/0.15/0.45) | 2.537 |
| $CO_2$/R41/R170(0.4/0.2/0.4) | 2.531 |
| $CO_2$/R41/R170(0.4/0.25/0.35) | 2.535 |
| $CO_2$/R41/R170(0.4/0.3/0.3) | 2.527 |
| $CO_2$/R41/R170(0.45/0.1/0.45) | 2.505 |
| $CO_2$/R41/R170(0.45/0.15/0.4) | 2.540 |
| $CO_2$/R41/R170(0.45/0.2/0.35) | 2.536 |
| $CO_2$/R41/R170(0.45/0.25/0.3) | 2.533 |
| $CO_2$/R41/R170(0.5/0.1/0.4) | 2.530 |
| $CO_2$/R41/R170(0.5/0.15/0.35) | 2.529 |
| $CO_2$/R41/R170(0.5/0.2/0.3) | 2.525 |
| $CO_2$/R41/R170(0.55/0.1/0.35) | 2.520 |
| $CO_2$/R41/R170(0.55/0.15/0.3) | 2.524 |
| $CO_2$/R41/R170(0.6/0.1/0.3) | 2.527 |

TABLE 5

| $COP_h$ ($T_e$ = –40° C., $T_{gc,o}$ = 35° C.) of system in the present disclosure under different refrigerant ratios | |
|---|---|
| Refrigerant | $COP_h$ ($T_e$ = –40° C., $T_{gc,o}$ = 35° C.) |
| $CO_2$/R41/R170(0.1/0.38/0.52) | 1.958 |
| $CO_2$/R41/R170(0.15/0.34/0.51) | 1.957 |
| $CO_2$/R41/R170(0.15/0.38/0.47) | 1.956 |
| $CO_2$/R41/R170(0.2/0.3/0.5) | 1.955 |
| $CO_2$/R41/R170(0.2/0.34/0.6) | 1.956 |
| $CO_2$/R41/R170(0.2/0.38/0.42) | 1.952 |
| $CO_2$/R41/R170(0.25/0.26/0.49) | 1.947 |
| $CO_2$/R41/R170(0.25/0.3/0.45) | 1.949 |
| $CO_2$/R41/R170(0.25/0.34/0.41) | 1.948 |
| $CO_2$/R41/R170(0.25/0.38/0.37) | 1.940 |
| $CO_2$/R41/R170(0.3/0.18/0.52) | 1.933 |
| $CO_2$/R41/R170(0.3/0.22/0.48) | 1.937 |

TABLE 5-continued

COP$_h$ (T$_e$ = −40° C., T$_{gc,o}$ = 35° C.) of system in the present disclosure under different refrigerant ratios

| Refrigerant | COP$_h$ (T$_e$ = −40° C., T$_{gc,o}$ = 35° C.) |
|---|---|
| $CO_2$/R41/R170(0.3/0.26/0.44) | 1.941 |
| $CO_2$/R41/R170(0.3/0.3/0.4) | 1.947 |
| $CO_2$/R41/R170(0.3/0.34/0.36) | 1.938 |
| $CO_2$/R41/R170(0.3/0.38/0.32) | 1.932 |
| $CO_2$/R41/R170(0.35/0.14/0.51) | 1.928 |
| $CO_2$/R41/R170(0.35/0.18/0.47) | 1.925 |
| $CO_2$/R41/R170(0.35/0.22/0.43) | 1.946 |
| $CO_2$/R41/R170(0.35/0.26/0.39) | 1.943 |
| $CO_2$/R41/R170(0.35/0.3/0.35) | 1.934 |
| $CO_2$/R41/R170(0.4/0.1/0.5) | 1.937 |
| $CO_2$/R41/R170(0.4/0.14/0.46) | 1.932 |
| $CO_2$/R41/R170(0.4/0.18/0.42) | 1.941 |
| $CO_2$/R41/R170(0.4/0.22/0.38) | 1.944 |
| $CO_2$/R41/R170(0.4/0.26/0.34) | 1.940 |
| $CO_2$/R41/R170(0.45/0.1/0.45) | 1.926 |
| $CO_2$/R41/R170(0.45/0.14/0.41) | 1.933 |
| $CO_2$/R41/R170(0.45/0.18/0.37) | 1.941 |
| $CO_2$/R41/R170(0.45/0.22/0.33) | 1.936 |
| $CO_2$/R41/R170(0.5/0.1/0.4) | 1.931 |
| $CO_2$/R41/R170(0.5/0.14/0.36) | 1.935 |
| $CO_2$/R41/R170(0.5/0.18/0.32) | 1.941 |
| $CO_2$/R41/R170(0.55/0.1/0.35) | 1.935 |
| $CO_2$/R41/R170(0.58/0.1/0.32) | 1.933 |

TABLE 6

COP$_h$ (T$_e$ = −60° C., T$_{gc,o}$ = 35° C.) of system in the present disclosure under different refrigerant ratios

| Refrigerant | COP$_h$ (T$_e$ = −60° C., T$_{gc,o}$ = 35° C.) |
|---|---|
| $CO_2$/R41/R170(0.1/0.38/0.52) | 1.465 |
| $CO_2$/R41/R170(0.15/0.34/0.51) | 1.453 |
| $CO_2$/R41/R170(0.15/0.38/0.47) | 1.448 |
| $CO_2$/R41/R170(0.2/0.3/0.5) | 1.449 |
| $CO_2$/R41/R170(0.2/0.34/0.46) | 1.452 |
| $CO_2$/R41/R170(0.2/0.38/0.42) | 1.450 |
| $CO_2$/R41/R170(0.25/0.26/0.49) | 1.453 |
| $CO_2$/R41/R170(0.25/0.3/0.45) | 1.442 |
| $CO_2$/R41/R170(0.25/0.34/0.41) | 1.424 |
| $CO_2$/R41/R170(0.25/0.38/0.37) | 1.430 |
| $CO_2$/R41/R170(0.3/0.18/0.52) | 1.439 |
| $CO_2$/R41/R170(0.3/0.22/0.48) | 1.441 |
| $CO_2$/R41/R170(0.3/0.26/0.44) | 1.452 |
| $CO_2$/R41/R170(0.3/0.3/0.4) | 1.443 |
| $CO_2$/R41/R170(0.3/0.34/0.36) | 1.397 |
| $CO_2$/R41/R170(0.35/0.14/0.51) | 1.430 |
| $CO_2$/R41/R170(0.35/0.18/0.47) | 1.444 |
| $CO_2$/R41/R170(0.35/0.22/0.43) | 1.440 |
| $CO_2$/R41/R170(0.35/0.26/0.39) | 1.433 |
| $CO_2$/R41/R170(0.4/0.1/0.5) | 1.438 |
| $CO_2$/R41/R170(0.4/0.14/0.46) | 1.439 |
| $CO_2$/R41/R170(0.4/0.18/0.42) | 1.440 |
| $CO_2$/R41/R170(0.4/0.22/0.38) | 1.435 |
| $CO_2$/R41/R170(0.45/0.1/0.45) | 1.438 |
| $CO_2$/R41/R170(0.45/0.14/0.41) | 1.441 |
| $CO_2$/R41/R170(0.45/0.18/0.37) | 1.440 |
| $CO_2$/R41/R170(0.5/0.1/0.4) | 1.437 |
| $CO_2$/R41/R170(0.5/0.14/0.36) | 1.436 |
| $CO_2$/R41/R170(0.54/0.1/0.36) | 1.435 |

TABLE 7

COP$_h$ (T$_e$ = −80° C., T$_{gc,o}$ = 35° C.) of system in the present disclosure under different refrigerant ratios

| Refrigerant | COP$_h$ (T$_e$ = −80° C., T$_{gc,o}$ = 35° C.) |
|---|---|
| $CO_2$/R41/R170(0.2/0.3/0.5) | 1.336 |
| $CO_2$/R41/R170(0.23/0.28/0.49) | 1.350 |

TABLE 7-continued

COP$_h$ (T$_e$ = −80° C., T$_{gc,o}$ = 35° C.) of system in the present disclosure under different refrigerant ratios

| Refrigerant | COP$_h$ (T$_e$ = −80° C., T$_{gc,o}$ = 35° C.) |
|---|---|
| $CO_2$/R41/R170(0.23/0.3/0.47) | 1.374 |
| $CO_2$/R41/R170(0.26/0.25/0.49) | 1.366 |
| $CO_2$/R41/R170(0.26/0.28/0.46) | 1.359 |
| $CO_2$/R41/R170(0.26/0.3/0.44) | 1.352 |
| $CO_2$/R41/R170(0.29/0.22/0.49) | 1.321 |
| $CO_2$/R41/R170(0.29/0.25/0.46) | 1.330 |
| $CO_2$/R41/R170(0.29/0.28/0.43) | 1.334 |
| $CO_2$/R41/R170(0.29/0.3/0.41) | 1.338 |
| $CO_2$/R41/R170(0.32/0.19/0.49) | 1.325 |
| $CO_2$/R41/R170(0.32/0.22/0.46) | 1.345 |
| $CO_2$/R41/R170(0.32/0.25/0.43) | 1.358 |
| $CO_2$/R41/R170(0.32/0.28/0.4) | 1.344 |
| $CO_2$/R41/R170(0.35/0.16/0.49) | 1.329 |
| $CO_2$/R41/R170(0.35/0.19/0.46) | 1.328 |
| $CO_2$/R41/R170(0.35/0.22/0.46) | 1.320 |
| $CO_2$/R41/R170(0.35/0.25/0.4) | 1.330 |
| $CO_2$/R41/R170(0.38/0.13/0.49) | 1.334 |
| $CO_2$/R41/R170(0.38/0.16/0.46) | 1.323 |
| $CO_2$/R41/R170(0.38/0.19/0.43) | 1.291 |
| $CO_2$/R41/R170(0.38/0.22/0.4) | 1.295 |
| $CO_2$/R41/R170(0.41/0.1/0.49) | 1.298 |
| $CO_2$/R41/R170(0.41/0.13/0.46) | 1.301 |
| $CO_2$/R41/R170(0.41/0.16/0.43) | 1.293 |
| $CO_2$/R41/R170(0.41/0.19/0.4) | 1.317 |
| $CO_2$/R41/R170(0.44/0.1/0.46) | 1.307 |
| $CO_2$/R41/R170(0.44/0.13/0.43) | 1.276 |
| $CO_2$/R41/R170(0.44/0.16/0.4) | 1.273 |
| $CO_2$/R41/R170(0.47/0.1/0.43) | 1.275 |
| $CO_2$/R41/R170(0.47/0.13/0.4) | 1.265 |
| $CO_2$/R41/R170(0.5/0.1/0.4) | 1.256 |

TABLE 8

COP$_h$ (T$_e$ = −90° C., T$_{gc,o}$ = 35° C.) of system in the present disclosure under different refrigerant ratios

| Refrigerant | COP$_h$ (T$_e$ = −90° C., T$_{gc,o}$ = 35° C.) |
|---|---|
| $CO_2$/R41/R170(0.27/0.25/0.48) | 1.175 |
| $CO_2$/R41/R170(0.29/0.23/0.48) | 1.189 |
| $CO_2$/R41/R170(0.29/0.25/0.46) | 1.213 |
| $CO_2$/R41/R170(0.31/0.21/0.48) | 1.205 |
| $CO_2$/R41/R170(0.31/0.23/0.46) | 1.198 |
| $CO_2$/R41/R170(0.31/0.25/0.44) | 1.191 |
| $CO_2$/R41/R170(0.33/0.19/0.48) | 1.161 |
| $CO_2$/R41/R170(0.33/0.21/0.46) | 1.169 |
| $CO_2$/R41/R170(0.33/0.23/0.44) | 1.173 |
| $CO_2$/R41/R170(0.33/0.25/0.42) | 1.177 |
| $CO_2$/R41/R170(0.35/0.17/0.48) | 1.164 |
| $CO_2$/R41/R170(0.35/0.19/0.46) | 1.184 |
| $CO_2$/R41/R170(0.35/0.21/0.44) | 1.197 |
| $CO_2$/R41/R170(0.35/0.23/0.42) | 1.183 |
| $CO_2$/R41/R170(0.37/0.15/0.48) | 1.168 |
| $CO_2$/R41/R170(0.37/0.17/0.46) | 1.167 |
| $CO_2$/R41/R170(0.37/0.19/0.44) | 1.159 |
| $CO_2$/R41/R170(0.37/0.21/0.42) | 1.169 |
| $CO_2$/R41/R170(0.39/0.13/0.48) | 1.173 |
| $CO_2$/R41/R170(0.39/0.15/0.46) | 1.162 |
| $CO_2$/R41/R170(0.39/0.17/0.44) | 1.132 |
| $CO_2$/R41/R170(0.39/0.19/0.42) | 1.134 |
| $CO_2$/R41/R170(0.41/0.11/0.48) | 1.137 |
| $CO_2$/R41/R170(0.41/0.13/0.46) | 1.141 |
| $CO_2$/R41/R170(0.41/0.15/0.44) | 1.132 |
| $CO_2$/R41/R170(0.41/0.17/0.42) | 1.156 |
| $CO_2$/R41/R170(0.43/0.11/0.46) | 1.146 |
| $CO_2$/R41/R170(0.43/0.13/0.44) | 1.115 |
| $CO_2$/R41/R170(0.43/0.15/0.42) | 1.112 |
| $CO_2$/R41/R170(0.45/0.11/0.44) | 1.114 |
| $CO_2$/R41/R170(0.45/0.13/0.42) | 1.104 |
| $CO_2$/R41/R170(0.47/0.11/0.42) | 1.095 |

By comparing the comparative examples in Table 2, Table 3, and Table 4, it can be seen that when the evaporation temperature is 0° C. or −20° C., and the outlet temperature of the gas cooler is 35° C., the $CO_2/R41/R170$ has a significantly better $COP_h$ than that of the R134a and R290 refrigerants commonly used in refrigeration/heat pump systems.

When the evaporation temperature is lower than −40° C. (including −40° C.), the R134a and R290 refrigerants are difficult to be used to work. However, the near-azeotropic mixture refrigerant in the present disclosure could still be used to work, with a COP of the system being greater than 1. This indicates that the near-azeotropic mixture refrigerant has a wider applicable temperature range and broader application.

Figure 2:
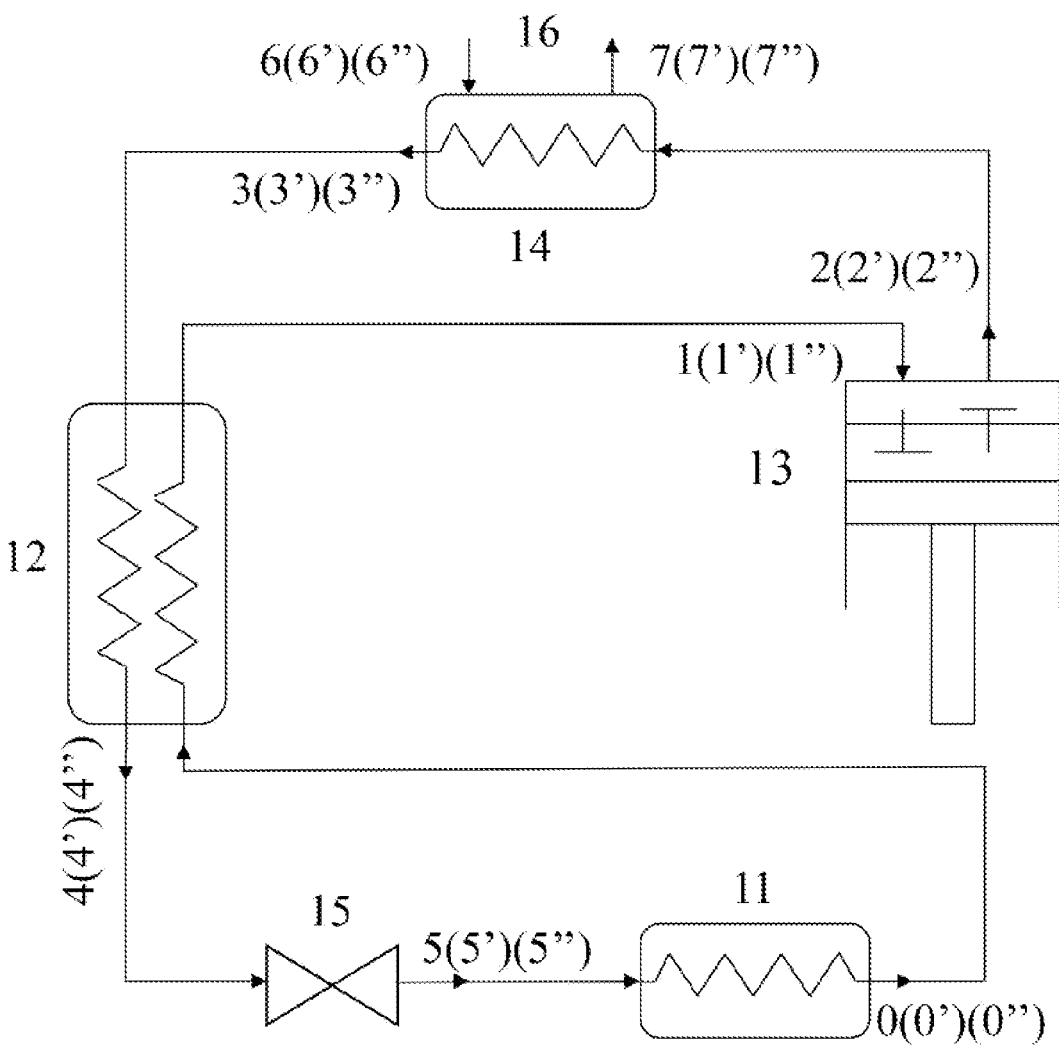
FIG. 2 shows a system schematic diagram of a heat pump water heater (HPWH).
Figure 3:
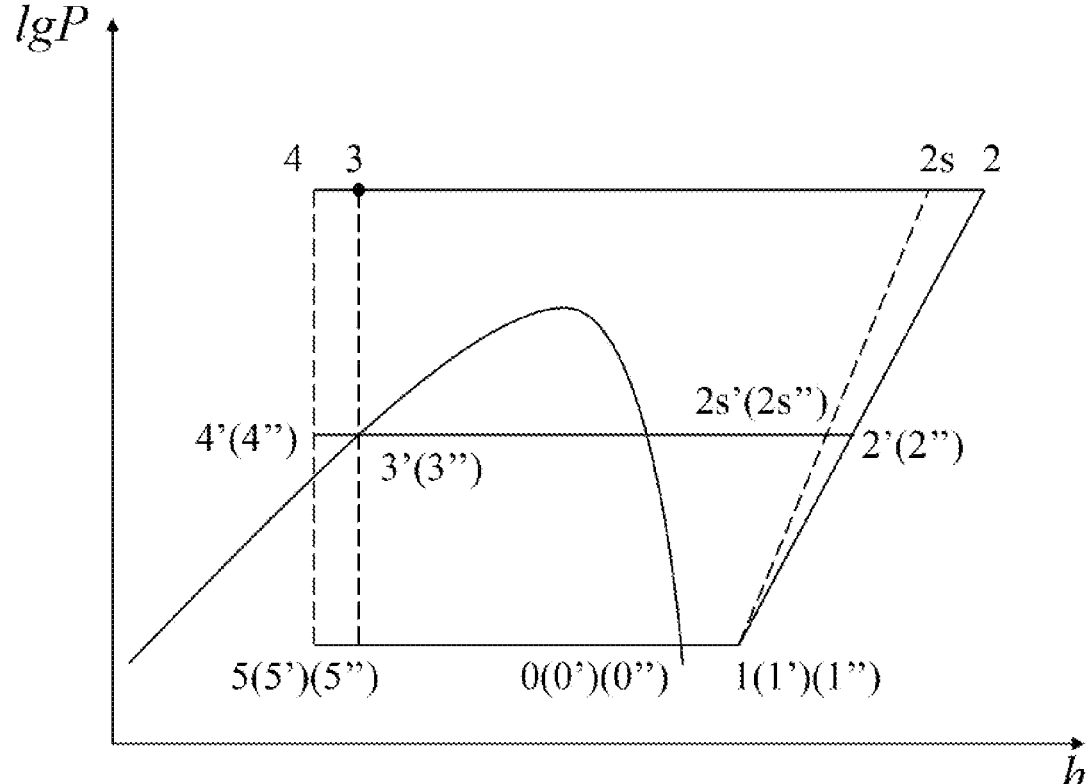
FIG. 3 shows a system pressure-enthalpy diagram of the HPWH.
Figure 4:
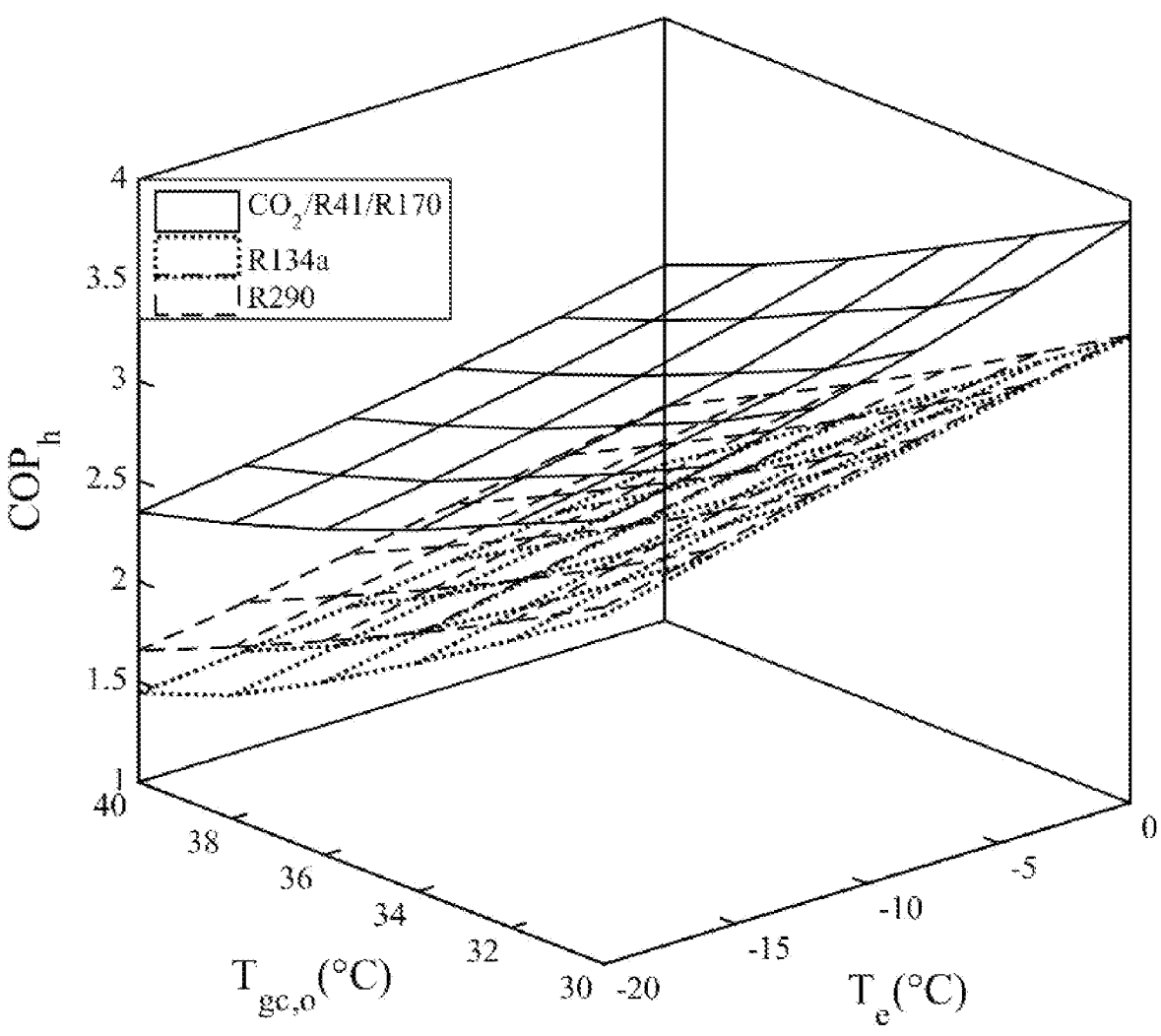
FIG. 4 graphically shows variation of $COP_h$ with $T_e$ and $T_{ge,o}$ in the $CO_2/R41/R170$ system, the R134a system, and the R290 system respectively.
Figure 5:
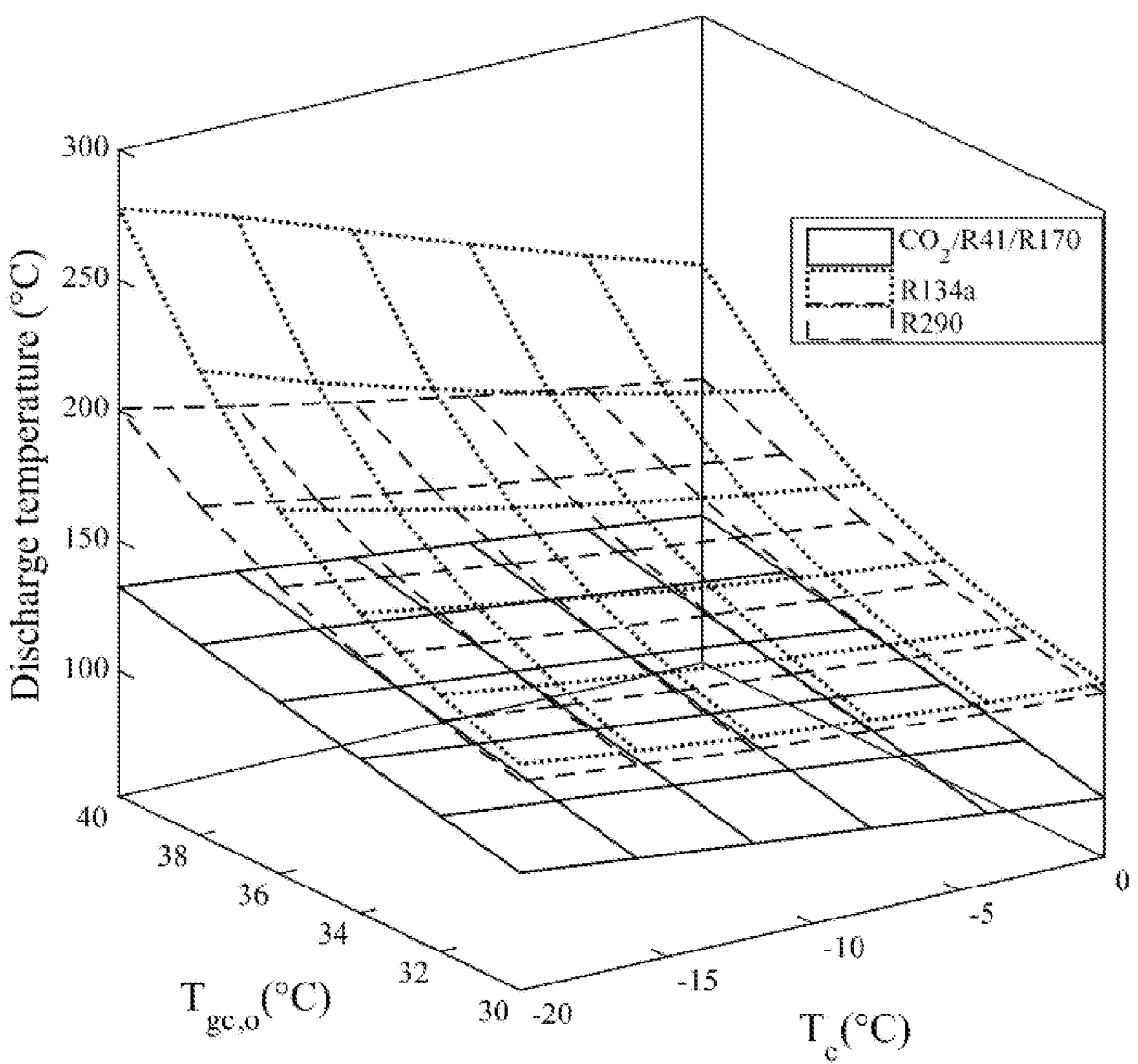
FIG. 5 graphically shows variation of discharge temperature with $T_e$ and $T_{ge,o}$ in the $CO_2/R41/R170$ system, the R134a system, and the R290 system respectively.
Figure 6:
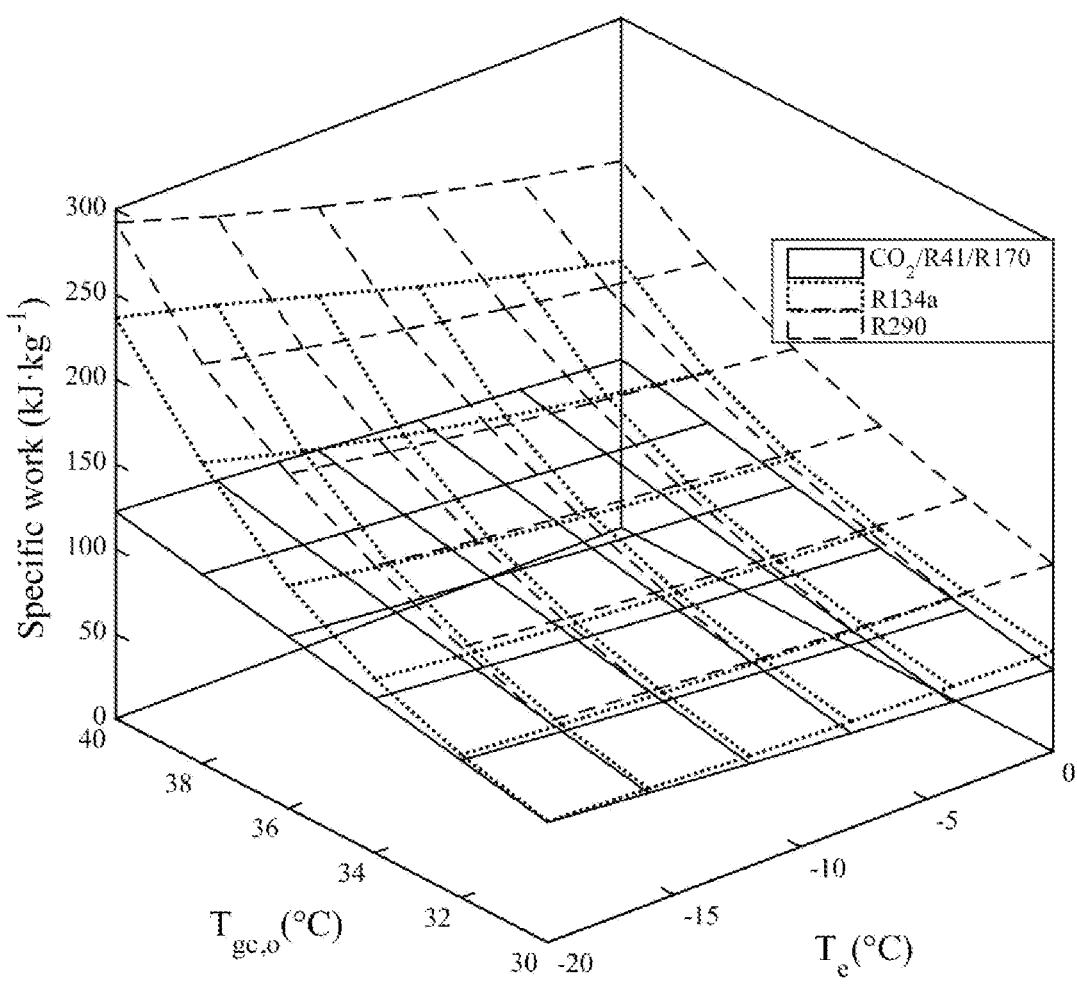
FIG. 6 graphically shows variation of specific work with $T_e$ and $T_{ge,o}$ in the $CO_2/R41/R170$ system, the R134a system, and the R290 system respectively.
Figure 7:
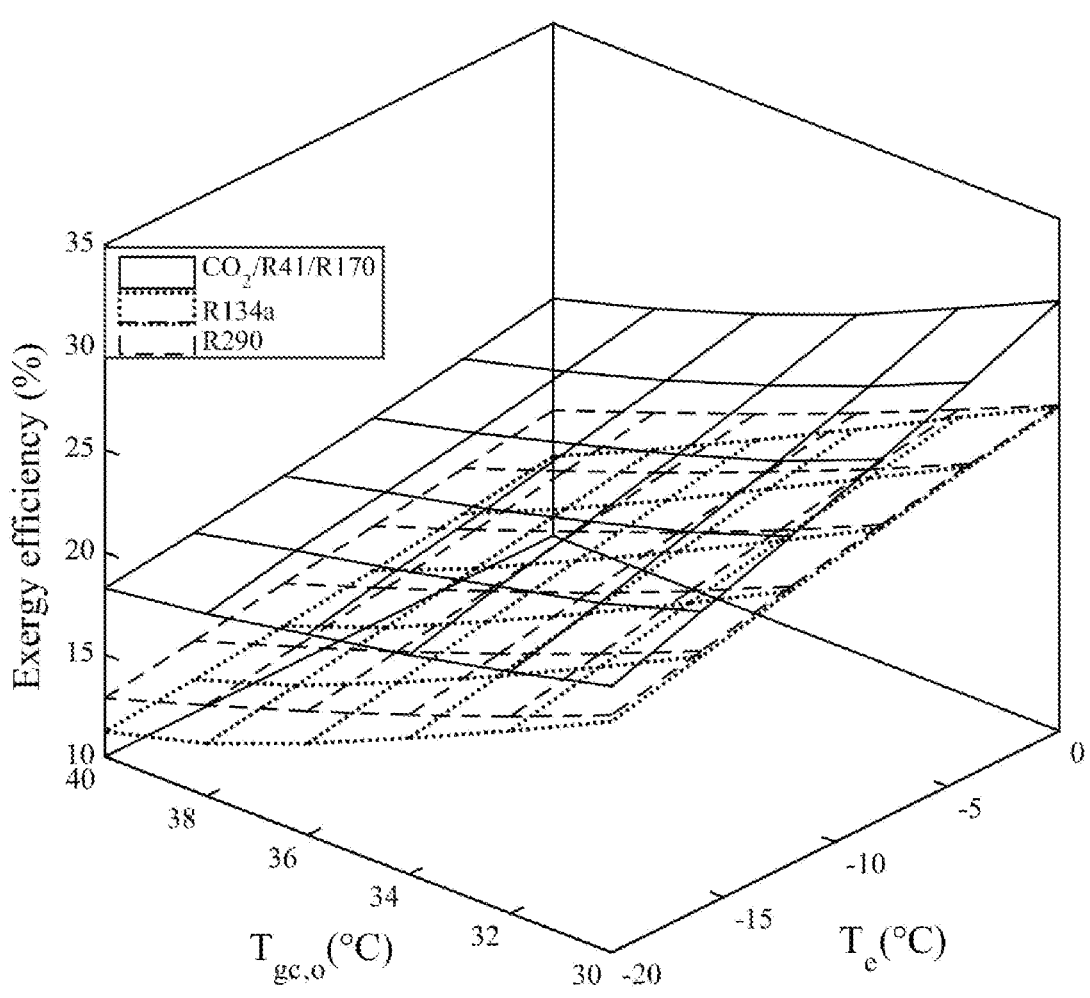
FIG. 7 graphically shows variation of exergy efficiency with $T_e$ and $T_{ge,o}$ in the $CO_2/R41/R170$ system, the R134a system, and the R290 system respectively.

As shown in FIG. 2 and FIG. 3, in the HPWH system with an internal heat exchanger, the refrigerant is feed into the internal heat exchanger from the outlet of the evaporator, and then passes through the compressor, gas cooler/condenser, internal heat exchanger, and expansion valve in sequence, and finally returns to the evaporator, forming a system cycle. The 0-7, 0'-7', and 0"-7" represents $CO_2/R41/R170$ cycle, R134a cycle, and R290 cycle, respectively.

As shown in FIG. 4 to FIG. 7, under the same conditions, the $COP_h$, discharge temperature, specific work, and exergy efficiency of the $CO_2/R41/R170$ system are significantly better than those of the R134a and R290 systems.

In summary, the near-azeotropic refrigerant of a ternary mixture $CO_2/R41/R170$ in the present disclosure has desirable characteristics such as ODP=0, low GWP, and small temperature glide. Comparing with the R134a and R290 refrigerants that are currently widely used in the market, the near-azeotropic refrigerant of a ternary mixture $CO_2/R41/R170$ has lower discharge temperature and specific work, and higher COP of refrigeration/heating and exergy efficiency under the same conditions. Therefore, the near-azeotropic refrigerant can be used as an alternative refrigerant with excellent comprehensive performances in refrigeration or heat pump systems. Most importantly, comparing with the existing ternary zeotropic mixture refrigerant, the refrigerant of the present disclosure can have lower temperature glide and GWP, which is beneficial to avoid the unstable system operation caused by component migration. In addition, in the system with $CO_2/R41/R170$ near-azeotropic mixture as a refrigerant, it is not necessary to completely empty the original refrigerant when replenishing the refrigerant, and the new refrigerant can be added directly. The refrigerant of the present disclosure can directly replace the existing $CO_2$ refrigerant without changing equipment, and has an efficiency higher than that of the commonly used R134a and R290 systems. As a result, this refrigerant can further meet the market demand and has an extremely high market value.

The technical features of the foregoing embodiments can be employed in arbitrary combinations. To provide a concise description, all possible combinations of all technical features of the foregoing embodiments may not be described; however, these combinations of technical features should be construed as disclosed in this specification as long as no contradiction occurs. It should be noted that "in one embodiment", "for example", "another example" and the like in the present disclosure are intended to illustrate rather than limit the present disclosure. The above examples are merely some embodiments of the present disclosure, and the description thereof is specific and detailed, but should not be construed as limiting the patent scope of the present disclosure. It should be noted that those of ordinary skill in the art can further make several variations and improvements without departing from the concept of the present disclosure, and all of these shall fall within the protection scope of the present disclosure. Therefore, the protection scope of the present disclosure shall be subject to the protection scope defined by the claims.

What is claimed is:

1. A near-azeotropic refrigerant of a ternary mixture $CO_2/R41/R170$, consisting of the following components by mass percentage: 10% to 40% of $CO_2$, 30% to 47% of R41, and 26% to 52% of R170, wherein the near-azeotropic refrigerant has a temperature glide of less than 0.2° C. at a bubble point temperature of at or below 0° C.

2. The near-azeotropic refrigerant of the ternary mixture $CO_2/R41/R170$ according to claim 1, consisting of the following components by mass percentage: 10% to 40% of the $CO_2$, 30% to 42% of the R41, and 30% to 48% of the R170, wherein the near-azeotropic refrigerant has the bubble point temperature of −20° C. to 0° C.

3. The near-azeotropic refrigerant of the ternary mixture $CO_2/R41/R170$ according to claim 1, consisting of the following components by mass percentage: 10% to 35% of the $CO_2$, 30% to 38% of the R41, and 32% to 52% of the R170, wherein the near-azeotropic refrigerant has the bubble point temperature of −40° C. to 0° C.

4. The near-azeotropic refrigerant of the ternary mixture $CO_2/R41/R170$ according to claim 1, consisting of the following components by mass percentage: 10% to 30% of the $CO_2$, 30% to 38% of the R41, and 36% to 52% of the R170, wherein the near-azeotropic refrigerant has the bubble point temperature of −60° C. to 0° C.

5. A near-azeotropic refrigerant of a ternary mixture $CO_2/R41/R170$, consisting of the following components by mass percentage: 10% to 15% of $CO_2$, 35% to 47% of R41, and 40% to 52% of R170, wherein the near-azeotropic refrigerant has a temperature glide of less than 0.2° C. at a bubble point temperature of at or below 0° C.

* * * * *